(12) United States Patent
Citeno et al.

(10) Patent No.: US 10,041,681 B2
(45) Date of Patent: Aug. 7, 2018

(54) MULTI-STAGE COMBUSTOR WITH A LINEAR ACTUATOR CONTROLLING A VARIABLE AIR BYPASS

(71) Applicant: General Electric Company, Schenectady, NY (US)

(72) Inventors: Joseph Vincent Citeno, Greenville, SC (US); Thomas Edward Johnson, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 916 days.

(21) Appl. No.: 14/452,568

(22) Filed: Aug. 6, 2014

(65) Prior Publication Data
US 2016/0040884 A1 Feb. 11, 2016

(51) Int. Cl.
*F23R 3/34* (2006.01)
*F23C 5/06* (2006.01)
*F23R 3/22* (2006.01)
*F02C 3/04* (2006.01)
*F02C 7/22* (2006.01)
*F02C 9/20* (2006.01)

(52) U.S. Cl.
CPC .............. *F23R 3/346* (2013.01); *F02C 3/04* (2013.01); *F02C 7/222* (2013.01); *F02C 9/20* (2013.01); *F23C 5/06* (2013.01); *F23R 3/22* (2013.01); *F05D 2220/32* (2013.01); *F05D 2260/60* (2013.01)

(58) Field of Classification Search
CPC .......... F23R 3/286; F23R 3/346; F23R 3/343; F23R 2900/00013; F23R 3/22; F02C 9/20; F02C 9/54; F23C 5/06
See application file for complete search history.

(56) References Cited

U.S. PATENT DOCUMENTS

| | | | | |
|---|---|---|---|---|
| 4,589,260 A | * | 5/1986 | Krockow | F23D 11/005 60/737 |
| 5,319,923 A | * | 6/1994 | Leonard | F23C 7/06 60/39.23 |
| 5,630,320 A | * | 5/1997 | Matsuda | F23R 3/18 60/749 |
| 5,802,854 A | * | 9/1998 | Maeda | F23R 3/346 60/39.821 |
| 8,322,143 B2 | * | 12/2012 | Uhm | F23R 3/286 60/737 |
| 8,887,507 B2 | * | 11/2014 | Davis, Jr. | F23R 3/283 60/737 |
| 9,422,867 B2 | | 8/2016 | Ostebee et al. | |
| 9,435,539 B2 | | 9/2016 | Keener et al. | |
| 9,441,544 B2 | | 9/2016 | McConnaughhay et al. | |

(Continued)

FOREIGN PATENT DOCUMENTS

WO WO 2007113130 A1 * 10/2007 ............... F23C 5/02

*Primary Examiner* — William H Rodriguez
*Assistant Examiner* — James McGlynn
(74) *Attorney, Agent, or Firm* — Eversheds Sutherland (US) LLP

(57) ABSTRACT

The present application provides a combustor for use with a gas turbine engine. The combustor may include a primary stage nozzle in communication with a linear actuator and a number of stationary secondary nozzles surrounding the primary stage nozzle in whole or in part. The linear actuator varies the position of the primary stage nozzle with respect to the stationary secondary nozzles.

12 Claims, 3 Drawing Sheets

(56) References Cited

U.S. PATENT DOCUMENTS

| | | |
|---|---|---|
| 9,447,975 B2 | 9/2016 | McConnaughhay et al. |
| 9,587,562 B2 | 3/2017 | Ostebee et al. |
| 2009/0056335 A1 | 3/2009 | Myers et al. |
| 2009/0056336 A1 | 3/2009 | Chila et al. |
| 2009/0064682 A1 | 3/2009 | Healy et al. |
| 2010/0005804 A1 | 1/2010 | Chen et al. |
| 2010/0011851 A1 | 1/2010 | Healy et al. |
| 2010/0162724 A1 | 7/2010 | Myers et al. |
| 2010/0175380 A1 | 7/2010 | Davis, Jr. et al. |
| 2010/0218501 A1* | 9/2010 | York ................ F23R 3/286 60/737 |
| 2011/0113783 A1 | 5/2011 | Boardman et al. |
| 2011/0217159 A1 | 9/2011 | McMahan et al. |
| 2011/0240769 A1 | 10/2011 | Khan et al. |
| 2012/0198851 A1 | 8/2012 | Davis, Jr. et al. |
| 2013/0025289 A1 | 1/2013 | Citeno et al. |
| 2013/0186092 A1* | 7/2013 | Bathina ............. F23R 3/045 60/737 |
| 2014/0216038 A1 | 8/2014 | Keener et al. |
| 2014/0216040 A1 | 8/2014 | Johnson et al. |
| 2014/0216048 A1 | 8/2014 | Ostebee et al. |
| 2014/0216051 A1 | 8/2014 | Johnson et al. |

* cited by examiner

MULTI-STAGE COMBUSTOR WITH A LINEAR ACTUATOR CONTROLLING A VARIABLE AIR BYPASS

TECHNICAL FIELD

The present application and the resultant patent relate generally to gas turbine engines and more particularly relate to a variable geometry, multi-stage, micro-mixer based combustor for efficient combustion with overall low emissions at elevated temperatures.

BACKGROUND OF THE INVENTION

The operational efficiency and the overall power output of a gas turbine engine generally increases as the temperature of the hot combustion gas stream increases. High combustion gas stream temperatures, however, may produce higher levels of nitrogen oxides ($NO_x$) and other types of regulated emissions. Such emissions may be subject to both federal and state regulations in the United States and also may be subject to similar regulations abroad. A balancing act thus exists between the benefits of operating the gas turbine engine in an efficient high temperature range while also ensuring that the output of nitrogen oxides and other types of regulated emissions remain well below mandated levels. Moreover, varying load levels, varying ambient conditions, and many other types of operational parameters also may have a significant impact on overall gas turbine efficiency and emissions.

Lower emission levels of nitrogen oxides and the like may be promoted by providing for good mixing of the fuel stream and the air stream prior to combustion. Such premixing tends to reduce combustion temperature gradients and the output of nitrogen oxides. One method of providing such good mixing is through the use of a combustor with a number of micro-mixer fuel nozzles. Generally described, a micro-mixer fuel nozzle mixes small volumes of the fuel and the air in a number of micro-mixer tubes within a plenum before combustion.

Although current micro-mixer combustors and micro-mixer fuel nozzles provide improved overall combustion performance, the operability window for a micro-mixer fuel nozzle in certain types of operating conditions may be defined at least partially by concerns with dynamics. Specifically, the operating frequencies of certain internal components may couple so as to create a high or a low frequency dynamics field. Such a dynamics field may have a negative impact on the physical properties of the combustor components as well as the downstream turbine components. Given such, current combustors may attempt to avoid such operating conditions by staging the flows of fuel and/or air to prevent the formation of such a dynamics field. Staging seeks to create a number of local zones of stable combustion even if the overall conditions place the combustor outside of typical operating limits in terms of emissions, flammability, and the like. Such staging, however, may require time intensive calibration and also may require operation at less than optimum levels in terms of output. Different types of staging configurations may be used.

There is thus a desire for improved micro-mixer combustor. Such improved micro-mixer combustor may promote good mixing of the flows of fuel and air therein so as to operate at higher temperatures and efficiency but with lower overall emissions and lower dynamics. Moreover, such improved micro-mixer combustor configurations may accomplish these goals without greatly increasing overall system complexity and costs.

SUMMARY OF THE INVENTION

The present application and the resultant patent provide a combustor for use with a gas turbine engine. The combustor may include a primary stage nozzle in communication with a linear actuator and a number of stationary secondary nozzles surrounding the primary stage nozzle in whole or in part. The linear actuator varies the position of the primary stage nozzle with respect to the number of stationary secondary nozzles.

The present application and the resultant patent further provide a method of operating a combustor. The method may include the steps of positioning a maneuverable primary stage nozzle within a number of stationary secondary nozzles, retracting the maneuverable primary stage nozzle with respect to the stationary secondary nozzles at partial load conditions, and extending the maneuverable primary stage nozzle with respect to the stationary secondary nozzles a full load conditions.

The present application and the resultant patent further provide a gas turbine engine. The gas turbine engine may include a compressor, a turbine, and a number of combustors. Each of the combustors may include a maneuverable primary stage nozzle and a number of stationary secondary nozzles surrounding the primary stage nozzle in whole or in part.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
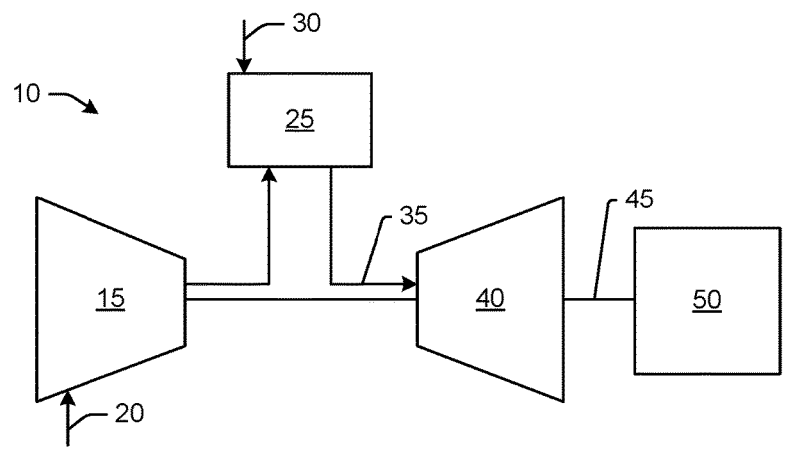
FIG. 1 is a schematic diagram of a gas turbine engine showing a compressor, combustor, and a turbine.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25 arranged in a circumferential array or otherwise. The flow of combustion gases 35 is delivered in turn to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
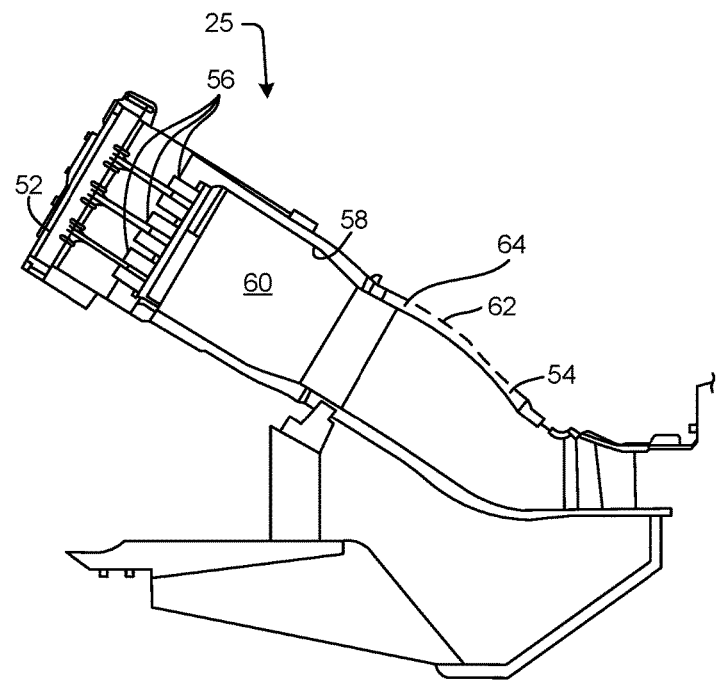
FIG. 2 is a schematic diagram of a combustor that may be used with the gas turbine engine of FIG. 1.

FIG. 2 shows a schematic diagram of an example of the combustor 25 as may be used with the gas turbine engine 10 described above and the like. The combustor 25 may extend from an end cover 52 at a head end to a transition piece 54 at an aft end about the turbine 40. A number of fuel nozzles 56 may be positioned about the end cover 52. A liner 58 may extend from the fuel nozzles 56 towards the transition piece 54 and may define a combustion zone 60 therein. The liner 58 may be surrounded by a case 62, sometime referred to as a flow sleeve. The liner 58 and the case 62 may define a flow path 64 therebetween for the flow of air 20 from the compressor 15 or otherwise. Any number of the combustors 25 may be used herein in a circumferential array and the like. As described above, the flow of air 20 and the flow of fuel 30 may be ignited in the combustor 25 to create the flow of combustion gases 35. The combustor 25 described herein is for the purpose of example only. Combustors with other components and other configurations may be used herein.

Figure 3:
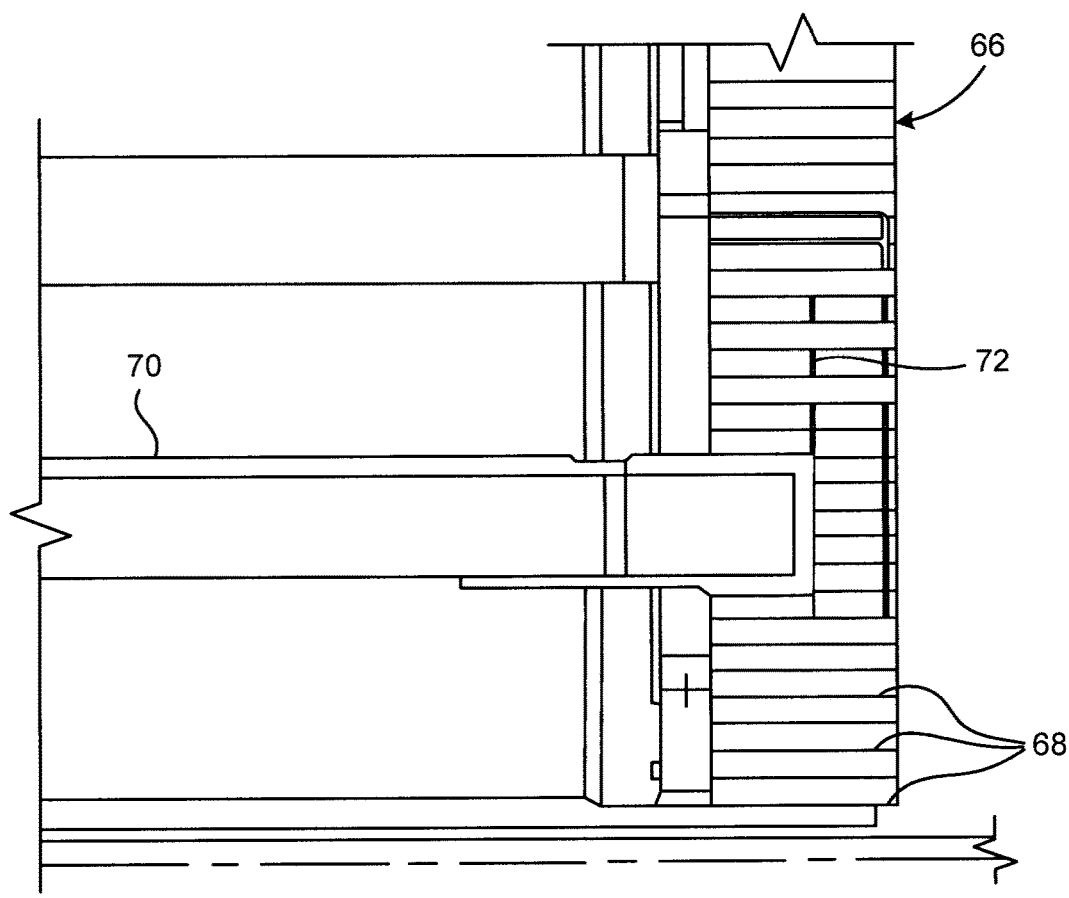
FIG. 3 is a schematic diagram of a portion of a micro-mixer fuel nozzle that may be used with the combustor of FIG. 2.

FIG. 3 shows a portion of a micro-mixer fuel nozzle 66 that may be used with the combustor 25 and the like. The micro-mixer fuel nozzle 66 may include a number of micro-mixer tubes 68 positioned about a fuel tube 70. The micro-mixer tubes 68 generally may have substantially uniform diameters and may be arranged in annular, concentric rows. Any number of the micro-mixer tubes 68 may be used herein in any size, shape, or configuration. The micro-mixer tubes 68 may be in communication with the flow of fuel 30 from the fuel tube 70 via a fuel plate 72 and the flow of air 20 from the compressor 15 via the flow path 64. A small volume of the flow of fuel 30 and a small volume of the flow of air 20 may mix within each of the micro-mixer tubes 68. The mixed fuel-air streams may flow downstream for combustion in the combustion zone 60 and used in the turbine 40 as described above. Other components and other configurations may be used herein.

Figure 4:
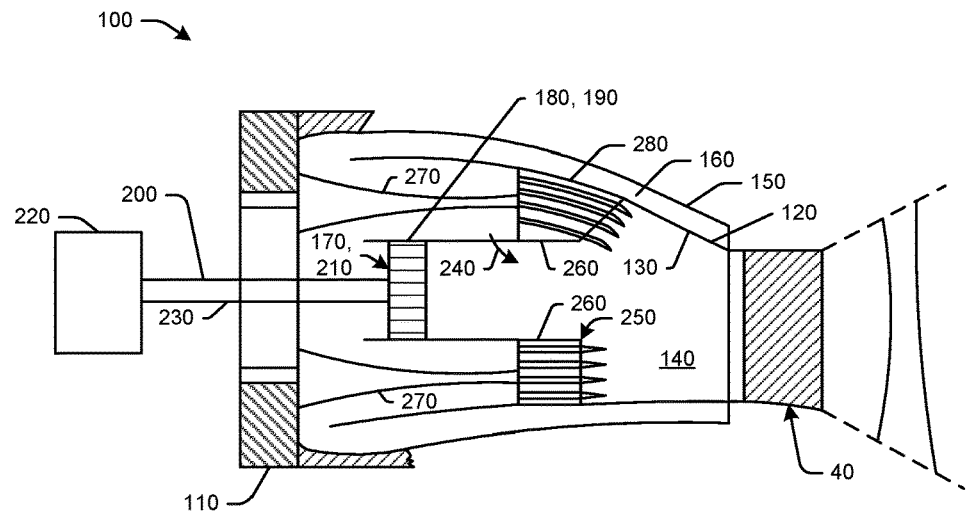
FIG. 4 is a schematic diagram of a multi-stage combustor as may be described herein.
Figure 5:
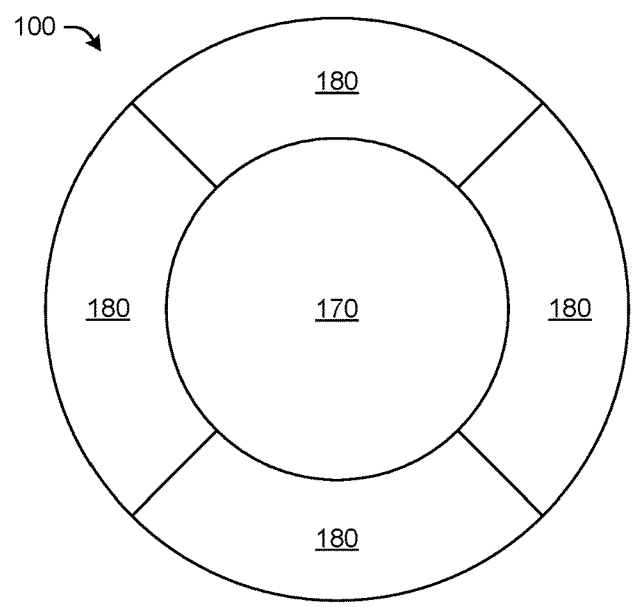
FIG. 5 is a schematic diagram of the fuel nozzles of the multi-stage combustor of FIG. 4.

FIGS. 4 and 5 show an example of a combustor 100 as may be described herein. Similar to that described above, the combustor 100 may extend from an end cover 110 at one end thereof to a transition piece 120 at the other end. A liner 130 may extend from the end cover 110 to the transition piece 120 and may define a combustion zone 140 therein. The liner 130 may be surrounded by a case 150, sometimes referred to as a flow sleeve. The liner 130 and the case 150 may define a flow path 160 therebetween. The flow path 160 may receive the flow of air 20 from the compressor 15 or otherwise. The liner 130, the combustion zone 140, the case 150, and the flow path 160 may have any suitable size, shape, or configuration. Any number of the combustors 100 may be used herein in a circumferential array and the like. Other components and other configurations may be used herein.

The combustor 100 may include a primary combustion stage 170. The primary combustion stage 170 may include a primary stage nozzle 180. The primary stage nozzle 180 may be a micro-mixer fuel nozzle 190. The micro-mixer fuel nozzle 190 may be similar to those described above. The primary stage nozzle 180 may be in communication with a primary fuel tube 200. The primary combustion stage 170 may be a variable volume stage 210. Given such, the primary stage nozzle 180 may be maneuverable. For example, the primary stage nozzle 180 may be in communication with a linear actuator 220. The linear actuator 220 may be positioned about the end cover 110 and outside thereof. The linear actuator 220 may be of conventional configuration and may provide linear or axial motion. The linear actuator 220 may be operated mechanically, electromechanically, piezo-electrically, pneumatically, hydraulically, and/or combinations thereof. By way of example, the linear actuator 220 may include a hydraulic cylinder, a rack and pinion system, a ball screw, a hand crank, or any type of device capable of providing controlled axial motion. The linear actuator 220 may be in communication with the overall gas turbine control system for dynamic operation based upon system feedback and the like.

The linear actuator 220 may be in communication with the primary fuel tube 200 via a drive rod 230 and the like. The drive rod 230 may have any suitable size, shape, or configuration. The primary fuel tube 200 may be positioned about or within the drive rod 230 for movement therewith. The linear actuator 220, the drive rod 230, and the primary fuel tube 200 thus may maneuver axially such that the position of the primary stage nozzle 180 may vary. The primary stage nozzle 180 also may include a variable air bypass 240 in communication with the flow of air 20. Other components and other configurations may be used herein.

The combustor 100 may include a secondary combustion stage 250. The secondary combustion stage 250 may include a number of secondary stage nozzles 260. The secondary stage nozzles 260 may be stationary. The secondary stage nozzles 260 may be micro-mixing nozzles 190 and the like. In this example, four (4) secondary stage nozzles 260 are shown although any number of the nozzles 260 may be used herein. The secondary stage nozzles 260 may be positioned circumferentially around the primary stage nozzle 180. Each of the secondary stage nozzles 260 may be fed by a secondary stage fuel tube 270. One or more of the secondary stage nozzles 260 may have an angled shape 280 in whole or in part. The angled shape 280 may substantially conform to that of the transition piece 120. Other suitable sizes and shapes may be used herein. Other components and other configurations also may be used herein.

Generally described, the primary combustion stage 170 may have a relatively long residence time against a small percentage of the premixed fuel/air at full power. The primary combustion stage 170 may be centrally located as a "sub-combustor" for the secondary or "main" combustion stage. The primary combustion stage 170 thus may be optimized for low power. The secondary combustion stage 250 may have a relatively low residence time, may receive no fuel at low power, and may receive the majority of the fuel at high power. As is shown, the primary combustion stage 170 and the secondary combustion stage 250 may be axially staged.

More specifically, the primary combustion stage 170 pilots the secondary combustion stage 250 at high power and receives low fuel flow at high power. The primary combustion stage 170 may incorporate variable geometry to provide a variable residence time. The primary combustion stage 170 may incorporate the variable air bypass 240 to improve light off, part speed, and low power operations. At low power, the primary stage nozzle 180 may be retracted for a long residence time. At high power, the primary stage nozzle 180 may be extended to lower the residence time. In a multi-cam configuration, the position of the primary stage nozzles 180 may be varied from can to can to provide "on the fly" adjustments to detune combustion dynamics from "coherent" combustion acoustic modes that may impact overall component lifetime. Depending upon excitation of coherent combustion modes, each can in a multi-can arrangement may have a separate axial setting to reduce the coherence of the acoustic energy between adjacent combustors.

A pre-reformer (not shown) may be used to partially react the fuel before the fuel is injected into the combustor to promote rapid and complete combustion of the fuel at very low residence times. Specifically, the reformer may partially oxidize the fuel so as to reduce the ignition delay time inside of the combustor so as to speed up the in-flame chemistry and reduce overall emissions.

In use, the primary fuel nozzle 180 may be retracted so as to provide a long residence time during light off and acceleration. The variable air bypass 240 may be active. During acceleration, the primary stage nozzle 180 may close a portion of the air bypass to achieve full speed, no load operation. During low power operations, the primary stage nozzle 180 may extend to reduce the size of the bypass at higher loads to retain emissions performance. At mid-power, the secondary stage nozzles 280 may be fueled at a low level to provide an additional heat release so as to enhance combustor activity. At higher power, more fuel may be added to the secondary combustion stage 250 until the secondary combustion stage 250 is receiving most or all of the fuel. At the highest power setting, the primary stage nozzle 180 may be fully extended. The secondary combustion stage 250 may be "tuned" to an outer to center fuel-split for combustor exit profile control so as to balance long component lifetime with efficiency at high firing temperatures.

The combustor 100 herein thus delivers the late lean fuel axially downstream of the flow sleeve pressure drop so as to prevent uncontrolled burning. The combustor 100 injects late lean axially as opposed to radially with the majority of the airflow so as to avoid circumferential hot spots that may lead to non-uniformity. The combustor 100 uses the primary stage nozzle 180 to traverse aft at higher power so as to reduce the overall residence time penalty therein. The use of the micro-mixer nozzle 190 thus provides increase emissions performance. Specifically, the combustor 100 provides overall increased efficiency, improved tunability, lower emissions, and improved overall durability.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A combustor, comprising:
a primary stage nozzle comprising a primary micro-mixer nozzle having a plurality of primary micro-mixer tubes;
a linear actuator comprising a drive rod in mechanical communication with the primary stage nozzle;
a primary stage fuel tube disposed within the drive rod and in fluid communication with the plurality of primary micro-mixer tubes; and
a plurality of stationary secondary nozzles surrounding the primary stage nozzle in whole or in part, wherein the plurality of stationary secondary nozzles comprise a plurality of secondary micro-mixer nozzles having a plurality of secondary micro-mixer tubes;
wherein the primary stage nozzle comprises a variable air bypass disposed between the primary stage nozzle and the plurality of stationary secondary nozzles; wherein the linear actuator varies the position of the primary stage nozzle with respect to the plurality of stationary secondary nozzles to increase the variable air bypass when the linear actuator is retracted with respect to the plurality of stationary secondary nozzles, and to decrease the variable air bypass when the linear actuator is extended with respect to the plurality of stationary secondary nozzles.

2. The combustor of claim 1, wherein each of the plurality of stationary secondary nozzles comprises a respective secondary stage fuel tube in fluid communication with the plurality of secondary micro-mixer tubes.

3. The combustor of claim 1, wherein the plurality of stationary secondary nozzles comprises four (4) stationary secondary nozzles.

4. The combustor of claim 1, wherein the plurality of stationary secondary nozzles comprises an angled shape.

5. The combustor of claim 1, further comprising a combustion zone downstream of the primary stage nozzle.

6. A method of operating a combustor, comprising:
positioning a maneuverable primary stage nozzle within a plurality of stationary secondary nozzles, wherein the maneuverable primary stage nozzle comprises a primary micro-mixer nozzle having a plurality of primary micro-mixer tubes, wherein the plurality of stationary secondary nozzles comprise a plurality of secondary micro-mixer nozzles having a plurality of secondary micro-mixer tubes;
retracting the maneuverable primary stage nozzle with respect to the plurality of stationary secondary nozzles at partial load conditions to increase a variable air bypass disposed between the primary stage nozzle and the plurality of stationary secondary nozzles; and
extending the maneuverable primary stage nozzle with respect to the plurality of stationary secondary nozzles at full load conditions to decrease the variable air bypass disposed between the primary stage nozzle and the plurality of stationary secondary nozzles.

7. The method of claim 6, further comprising the step of providing a flow of fuel only to the maneuverable primary stage nozzle at partial load conditions.

8. The method of claim 6, further comprising the step of increasing a flow of fuel to the plurality of stationary secondary nozzles as a load thereon increases while decreasing the flow of fuel to the maneuverable primary stage nozzle.

9. The method of claim 6, further comprising the step of providing a flow of fuel only to the plurality of stationary secondary nozzles at full load conditions.

10. The method of claim 6, further comprising the step of varying a position of the maneuverable primary stage nozzle with respect to the plurality of stationary secondary nozzles so as to vary combustion dynamics therein.

11. A gas turbine engine, comprising:
a compressor;
a turbine; and
a plurality of combustors;
each of the plurality of combustors comprising a maneuverable primary stage nozzle and a plurality of stationary secondary nozzles surrounding the primary stage nozzle in whole or in part, wherein the maneuverable primary stage nozzle comprises a primary micro-mixer nozzle having a plurality of primary micro-mixer tubes, wherein the plurality of stationary secondary nozzles comprise a plurality of secondary micro-mixer nozzles having a plurality of secondary micro-mixer tubes, wherein each of the plurality of combustors comprises a variable air bypass in fluid communication with the maneuverable primary stage nozzle, wherein each of the plurality of combustors comprises a linear actuator in mechanical communication with the maneuverable primary stage nozzle, wherein the linear actuator varies the position of the maneuverable primary stage nozzle with respect to the plurality of stationary secondary nozzles to increase the variable air bypass when the linear actuator is retracted with respect to the plurality of stationary secondary nozzles, and to decrease the variable air bypass when the linear actuator is extended with respect to the plurality of stationary secondary nozzles.

12. The gas turbine engine of claim 11, wherein one or more of the plurality of stationary secondary nozzles comprises an angled shape.

\* \* \* \* \*